United States Patent
Hagny et al.

(10) Patent No.: US 11,291,155 B2
(45) Date of Patent: Apr. 5, 2022

(54) DOWN-PRESSURE SYSTEM FOR IMPLEMENT WITH OPENER ASSEMBLIES MOUNTED TO ADJUSTABLE ROCKSHAFT

(71) Applicants: Matthew P Hagny, Bel Aire, KS (US); Jeffrey Alan Harris, Salina, KS (US)

(72) Inventors: Matthew P Hagny, Bel Aire, KS (US); Jeffrey Alan Harris, Salina, KS (US)

(73) Assignee: Emilie Downs, Denver, CO (US)

( * ) Notice: Subject to any disclaimer, the term of this patent is extended or adjusted under 35 U.S.C. 154(b) by 0 days.

(21) Appl. No.: 15/361,330

(22) Filed: Nov. 25, 2016

(65) Prior Publication Data
US 2017/0142897 A1    May 25, 2017

Related U.S. Application Data

(60) Provisional application No. 62/259,471, filed on Nov. 24, 2015.

(51) Int. Cl.
*A01C 7/20* (2006.01)
*A01C 5/06* (2006.01)

(52) U.S. Cl.
CPC .............. *A01C 7/205* (2013.01); *A01C 5/064* (2013.01)

(58) Field of Classification Search
CPC ........... A01C 5/06; A01C 5/064; A01C 5/068; A01B 63/32
See application file for complete search history.

(56) References Cited

U.S. PATENT DOCUMENTS

| | | | |
|---|---|---|---|
| 4,353,423 A * | 10/1982 | Poggemiller | A01B 61/046 111/14 |
| 4,760,806 A | 8/1988 | Bigbee et al. | |
| 5,065,681 A | 11/1991 | Hadley | |
| 5,724,902 A | 3/1998 | Janelle et al. | |
| 5,727,638 A * | 3/1998 | Wodrich | A01C 5/06 111/151 |
| 6,386,127 B1 | 5/2002 | Prairie et al. | |
| 6,701,857 B1 * | 3/2004 | Jensen | A01B 63/32 111/200 |

(Continued)

*Primary Examiner* — Alicia Torres
(74) *Attorney, Agent, or Firm* — Jeffrey L. Thompson; Thompson Law, P.A.

(57) ABSTRACT

A down-pressure system for an agricultural seeder includes single-action hydraulic cylinders connected between a rockshaft assembly and respective opener assemblies. The single-action hydraulic cylinders are connected to a pressure-regulated hydraulic circuit. The regulated pressure from the hydraulic circuit operates to bias the hydraulic cylinders in an extended direction to apply downforce to the opener assemblies when the rockshaft assembly is in its lowered condition with the opener assemblies engaging the soil. A double-acting hydraulic cylinder is provided for rotating the rockshaft assembly between a raised transport position and a lowered field working position. The double-acting hydraulic cylinder and the single-action hydraulic cylinders for applying down-pressure to the opener assemblies can be operated on the same hydraulic circuit, or on separate circuits. Multiple groups of the single-action hydraulic cylinders can be connected in parallel to respective headers to facilitate pressure equalization among the single-action hydraulic cylinders.

23 Claims, 5 Drawing Sheets

(56) References Cited

U.S. PATENT DOCUMENTS

| | | | | |
|---|---|---|---|---|
| 8,544,397 B2* | 10/2013 | Bassett | ................ | A01C 7/205 |
| | | | | 111/135 |
| 9,144,189 B2* | 9/2015 | Stoller | ................ | A01C 5/062 |
| 2011/0313575 A1* | 12/2011 | Kowalchuk | ............ | A01C 7/205 |
| | | | | 700/282 |
| 2014/0214284 A1* | 7/2014 | Sauder | ................ | A01C 7/205 |
| | | | | 701/50 |
| 2014/0360741 A1* | 12/2014 | Campbell | ............ | A01B 61/046 |
| | | | | 172/166 |
| 2017/0356474 A1* | 12/2017 | Stoller | ................ | A01C 5/064 |

* cited by examiner

DOWN-PRESSURE SYSTEM FOR IMPLEMENT WITH OPENER ASSEMBLIES MOUNTED TO ADJUSTABLE ROCKSHAFT

RELATED APPLICATIONS

This application claims the benefit of U.S. Provisional Patent Application No. 62/259,471 filed on Nov. 24, 2015. The entire content of this related application is incorporated herein by reference.

BACKGROUND OF THE INVENTION

Field of the Invention

The present invention relates generally to opener assemblies for agricultural implements, and in particular, to a down-pressure system for use with opener assemblies that are mounted to an adjustable rockshaft.

Description of the Prior Art

Agricultural seeders used in no-till farming practices require openers with down-pressure systems that provide a relatively high downforce for adequate ground penetration. An example of such openers is shown in U.S. Pat. No. 4,760,806 issued to Bigbee et al. This type of opener, commercially available on John Deere xx50, xx60, and xx90-series grain drills, has a down-pressure spring that compresses to apply a downforce to the opener.

Figure 1:
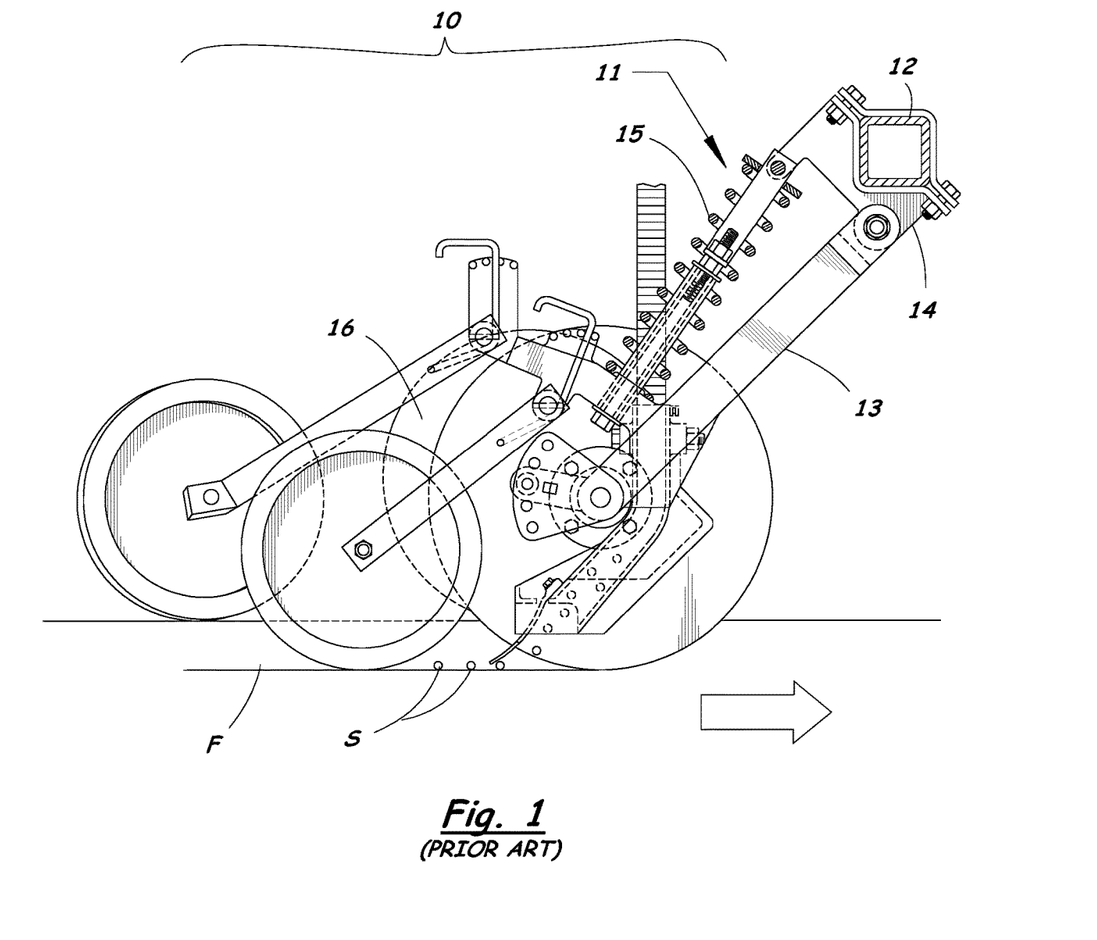
FIG. 1 is a cross-sectional side view of a prior art grain drill opener assembly mounted to an adjustable rockshaft with a mechanical spring for applying downforce.

A grain drill opener assembly 10 having a conventional down-pressure system 11 is illustrated in FIG. 1. A rockshaft assembly 12 for raising and lowering the opener assembly 10 is arranged to pivot about a transverse horizontal axis. The rockshaft assembly 12 is rotatable between a first position in which the opener assembly 10 is raised for transport, and a second position in which the opener assembly 10 is lowered for engaging the soil.

The opener assembly 10 is mounted to the rockshaft assembly 12 by an opener arm 13. The opener arm 13 is pivotally connected to a mounting bracket 14 on the rockshaft assembly 12. The down-pressure system 11 provides a down-force on the opener assembly 10. The down-pressure system 11 includes a mechanical coil spring 15 connected between the mounting bracket 14 on the rockshaft assembly 12 and the opener assembly 10 (specifically, an extension of opener arm 13). The down-pressure system 11 shown in FIG. 1 is similar to the conventional down-pressure system disclosed in the '806 patent.

The conventional down-pressure system 11 provides an effective range of up and down movement of the opener assembly 10 that is less than desired in typical field conditions. The coil spring 15 compresses about 1 to 2.5 inches from being completely relaxed to what is optimal for normal field operation, depending on the down-pressure deployed (how much twist of the rockshaft hydraulically [see FIG. 3], and how much frame weight is available). The coil spring 15 can be compressed further if it strikes an obstacle or goes up over a big mound of soil. However, the coil spring 15 starts to relax in the smallest depression (due to the angles involved, an inch of compression or decompression of the coil spring 15 results in about 3.5 inches of opener up/down travel at the gauge wheel 16). As a result, the coil spring 15 becomes ineffective soon thereafter and no longer supplies enough downforce to keep the opener at the desired depth setting. The lack of adequate downforce results in seeds S that are too shallow or perhaps even on top of the soil surface and can also result in failure to cut stalks, stubble, and leaves (a.k.a. "residue" or mulch) lying on the soil surface (the so-called hairpinning of residue—folding and tucking the residue into the furrow F, instead of cutting it).

To help alleviate this problem, most drill operators will run more down-pressure, and add extra ballast to the frame/toolbar. This results in some of the openers across the width of the implement having far more downforce than necessary, in order to keep the majority of openers engaged in the soil. Even so, there are far too many instances where individual openers, or groups of openers, will not be cutting the stubble and the soil adequately. For example, if the opener is in a small depression (including wheel tracks in long-term no-till soil conditions) causing the spring to relax 25%, there will be an approximately 25% reduction in down-force on that opener, which often causes loss of depth consistency, and/or hairpinning. Seeds that are too shallow or are tucked into straw or stalks will often fail to establish, due to inadequate protection from drying out, or increased disease pressure, or predation. Plants thus weakened may be subject to winter-kill or winter-injury if the crop is an overwintering crop, such as winter wheat.

Down-pressure systems that use double-acting hydraulic cylinders to raise and lower opener assemblies are known in the prior art. For example, U.S. Pat. No. 5,724,902 issued to Janelle et al. discloses an agricultural seeder that uses a double-acting hydraulic cylinder to apply down-pressure to the opener assembly and to raise the opener assembly into a transport position.

There is a need for an improved down-pressure system for use with grain drill opener assemblies, and particularly those grain drills that use an adjustable rockshaft to raise and lower the opener assemblies.

SUMMARY OF THE INVENTION

An object of the present invention is to provide an improved down-pressure system for use with grain drills and other agricultural implements that use an adjustable rockshaft to raise and lower opener assemblies.

A further object of the present invention is to provide a down-pressure system that can be retrofitted to existing implements in place of OEM mechanical spring down-pressure systems.

A further object of the present invention is to provide a down-pressure system for opener assemblies that increases a range of movement of the opener assembly while maintaining a consistent and uniform downforce on the opener assembly.

To accomplish these and other objects of the invention, a down-pressure system is provided for an agricultural seeder that includes single-action hydraulic cylinders connected between a rockshaft assembly and respective opener assemblies. The single-action hydraulic cylinders are connected to a pressure-regulated hydraulic circuit. The regulated pressure from the hydraulic circuit operates to bias the hydraulic cylinders in an extended direction to apply downforce to the opener assemblies when the rockshaft assembly is in its lowered condition with the opener assemblies engaging the soil. The OEM (prior art) double-acting hydraulic cylinders are retained for rotating the rockshaft assemblies between their raised transport position and their lowered field-working position. The double-acting hydraulic cylinders and the single-action hydraulic cylinders for applying down-pressure to the opener assemblies can be operated on the same hydraulic circuit, or on separate circuits. Multiple groups of the single-action hydraulic cylinders can be connected in parallel to respective headers to facilitate pressure equalization among the single-action hydraulic cylinders.

According to one aspect of the present invention, an agricultural implement is provided, comprising: a frame adapted for forward movement over a field; a rockshaft assembly connected to the frame, the rockshaft assembly being arranged to pivot about a transverse horizontal axis; an opener assembly comprising an opener arm and a furrow opener, the opener arm having a first end pivotally connected to the rockshaft assembly at a first connection point, and a second end supporting the furrow opener; and a down-pressure system for adjustably biasing the opener assembly. The down-pressure system comprises a linear actuator, and the linear actuator has a first actuator end connected to the rockshaft assembly at a second connection point and a second actuator end connected to the opener assembly.

According to another aspect of the present invention, a down-pressure system is provided for adjustably biasing an opener arm in an agricultural implement. The implement has a frame adapted for forward movement over a field, and an opener assembly having an opener arm with a first end pivotally connected at a first connection point to a rockshaft assembly for rocking movement about a transverse horizontal axis and a second end supporting a furrow opener. The down-pressure system includes a hydraulic actuator having a first actuator end connected to the rockshaft assembly at a second connection point spaced from the first connection point, and a second actuator end connected to the opener assembly.

According to another aspect of the present invention, a down-pressure system is provided for adjustably biasing an opener arm in an agricultural grain drill. The grain drill has a frame adapted for forward movement over a field, an opener assembly having an opener arm and a furrow opener, a rockshaft assembly connected to the frame for pivoting about a transverse horizontal axis, the opener arm having a first end pivotally connected to the rockshaft assembly and a second end supporting the furrow opener, and a double-action hydraulic cylinder connected between the frame and the rockshaft assembly for rotating the rockshaft assembly between a first position in which the opener assembly is raised for transport and a second position in which the opener assembly is lowered for engaging soil. The down-pressure system includes a hydraulic actuator having a first actuator end connected to the rockshaft assembly, and a second actuator end connected to the opener assembly. The hydraulic actuator includes a single-action hydraulic cylinder connected to a source of hydraulic pressure to bias the hydraulic cylinder in an extended direction to apply downforce to the opener assembly when the rockshaft is rotated to the second position.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A down-pressure system 20 for an agricultural implement with opener assemblies 21 mounted to an adjustable rockshaft assembly 12 according to the present invention will now be explained in detail with reference to FIGS. 2 to 5 of the accompanying drawings.

The agricultural implement includes a frame 23 (see FIG. 3) adapted for forward movement over a field. A hitch structure (not shown) is provided at the front of the frame 23, and a plurality of transport wheels (not shown) are provided to support the frame 23 above the ground.

The rockshaft assembly 12, also sometimes referred to as a "torque tube," is connected to the frame 23 and is arranged to pivot about a transverse horizontal axis. The rockshaft assembly 12 may be in the form of a heavy square metal tube 24, as shown in cross section in FIGS. 2 and 3. However, at least a portion of the rockshaft assembly 12 includes a round section 25 supported by a pillow block 26 to facilitate smooth rotation of the rockshaft assembly 12 about its axis.

Figure 3:
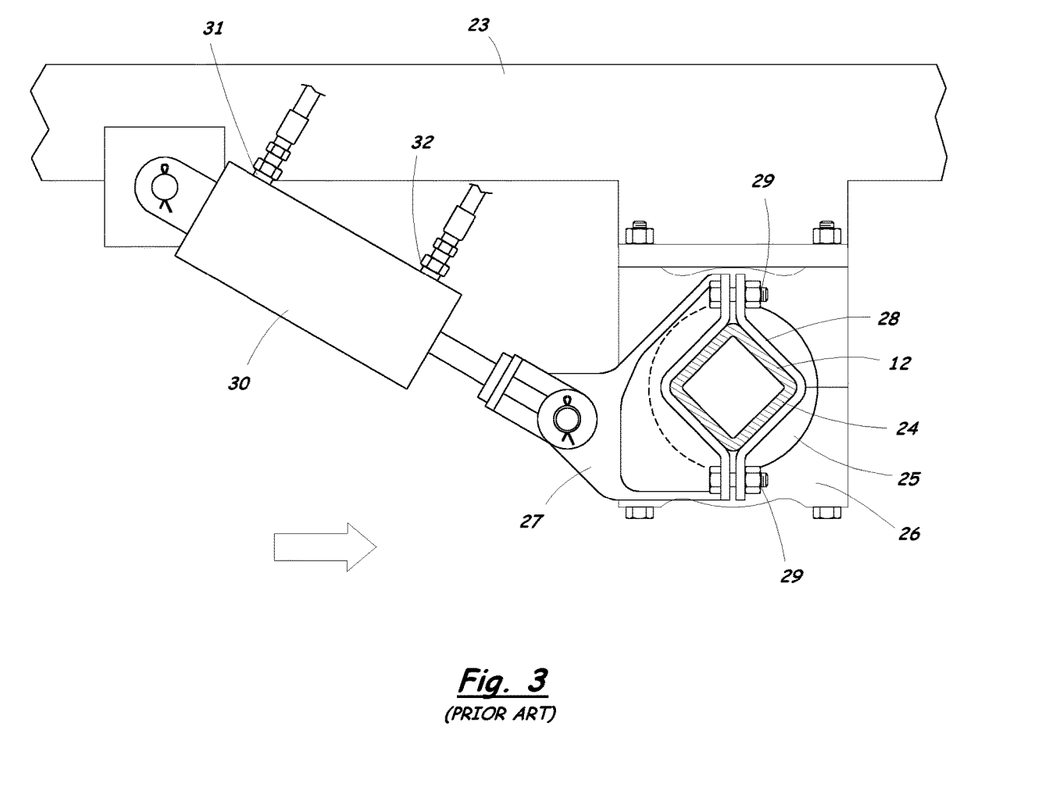
FIG. 3 is a cross-sectional side view of the prior art implement frame showing the rockshaft connected to a double-acting hydraulic cylinder for rotating the rockshaft to raise and lower the opener assembly.

A rockshaft actuator bracket 27 (FIG. 3) is attached to the rockshaft tube 24 using a clamping structure 28 and fasteners 29, such as bolts. A double-acting hydraulic cylinder 30 is connected between the frame 23 and the actuator bracket 27. The double-acting hydraulic cylinder 30 can be extended by applying hydraulic pressure to a first port 31, and retracted by applying hydraulic pressure to a second port 32. The rockshaft assembly 12 rotates in a first direction (i.e., counterclockwise as shown in FIG. 3) when the hydraulic cylinder 30 is being extended, and in a second direction (i.e., clockwise as shown in FIG. 3) when the hydraulic cylinder 30 is being retracted. The hydraulic cylinder 30 is operable to rotate the rockshaft assembly 12 between a first position in which the opener assemblies 21 are raised for transport, and a second position in which the opener assemblies 21 are lowered for engaging the soil.

Figure 2:
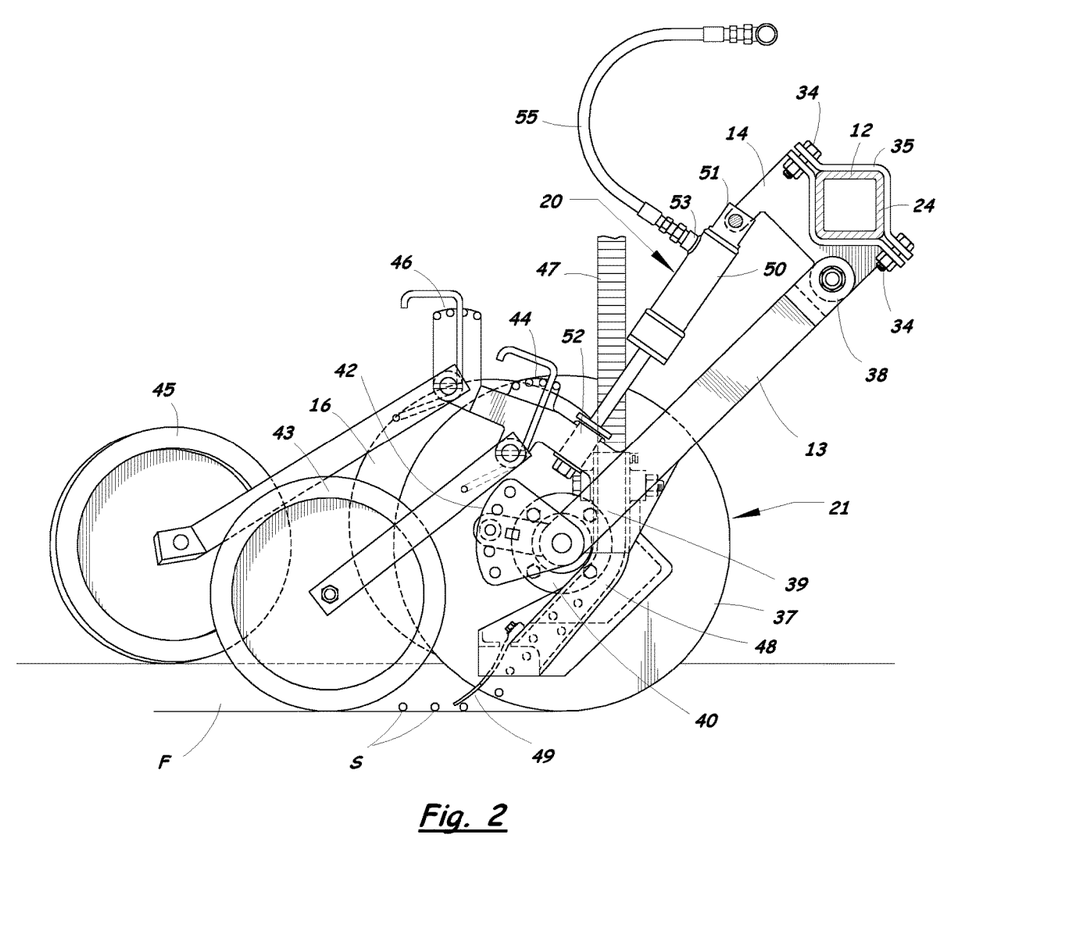
FIG. 2 is a cross-sectional side view of a grain drill opener assembly according to the present invention, with a single-action hydraulic cylinder connected between an adjustable rockshaft and the opener assembly.

The implement includes a plurality of opener assemblies 21 arranged in spaced relationship across the width of the implement. The opener assemblies 21 are mounted to respective mounting brackets 14 attached to the rockshaft 24. The mounting brackets 14 are each attached to the rockshaft 24 using four threaded fasteners 34 and a clamping structure 35.

Each of the opener assemblies 21 includes an opener arm 13 and a furrow opener blade 37 (a.k.a. opener "disk"). The opener arm 13 has a first end 38 pivotally connected to a respective one of the mounting brackets 14, and a second end 39 supporting the furrow opener blade 37. The opener blade 37 is mounted to a hub 40 on the opener arm 13 and arranged to operate at a slight angle to the direction of travel to cut a furrow F in the soil as the implement moves through the field. Alternatively, a pair of blades 37 may be arranged to create furrow F. A gauge wheel 16 is supported for rotation adjacent to the opener blade 37 to limit the blade 37 to a desired depth of operation. An adjustment mechanism 42 is provided for adjusting the gauge wheel 16 vertically with respect to the opener blade 37 to change the depth of operation.

A firming wheel 43 follows behind the opener blade 37 for firming the seeds S into soil in the bottom of the furrow F created by the opener blade 37 to provide good seed-to-soil contact in the furrow F. A firming adjustment mechanism 44 allows the downforce on the firming wheel 43 to be adjusted.

A closing wheel 45 follows behind the firming wheel 43 for crushing the side of the furrow F to provide a layer of soil over the seeds S deposited in the furrow F. A closing adjustment mechanism 46 allows the downforce on the closing wheel 45 to be adjusted.

A seed tube 47 and seed boot 48 are provided for directing seeds S downwardly and rearwardly into the furrow F created by the opener blade 37. A seed bounce flap 49 is attached to trail below and/or behind the seed boot 48 for preventing seeds S from bouncing out of the furrow F beyond the lower end of the seed channel through the seed boot 48.

Down-pressure systems 20 are associated with each of the opener assemblies 21 to provide an adjustable and uniform downforce on the opener blades 37. The down-pressure systems 20 include, for each opener assembly 21, a linear actuator 50 having a first end 51 pivotally connected to a respective one of the mounting brackets 14, and a second end 52 connected to the opener assembly 21.

In the preferred embodiment, the linear actuator 50 is a single-action hydraulic cylinder. The single-action cylinder 50 has a port 53 connected to a source of pressurized hydraulic fluid that forces the single-action hydraulic cylinder 50 in an extended direction to apply downforce to the opener assembly 21. In alternative embodiments, the linear actuator 50 can be a double-acting hydraulic cylinder.

The first end 51 of the hydraulic actuator 50 is spaced from the first end 38 of the opener arm 13 so that changing the length of the hydraulic actuator 50 causes the opener arm 13 to pivot relative to the mounting bracket 14. This arrangement also allows the pressure applied to extend the hydraulic actuator 50 to be transferred to the opener assembly 21 as a downward biasing force on the opener assembly 21.

Figure 4:
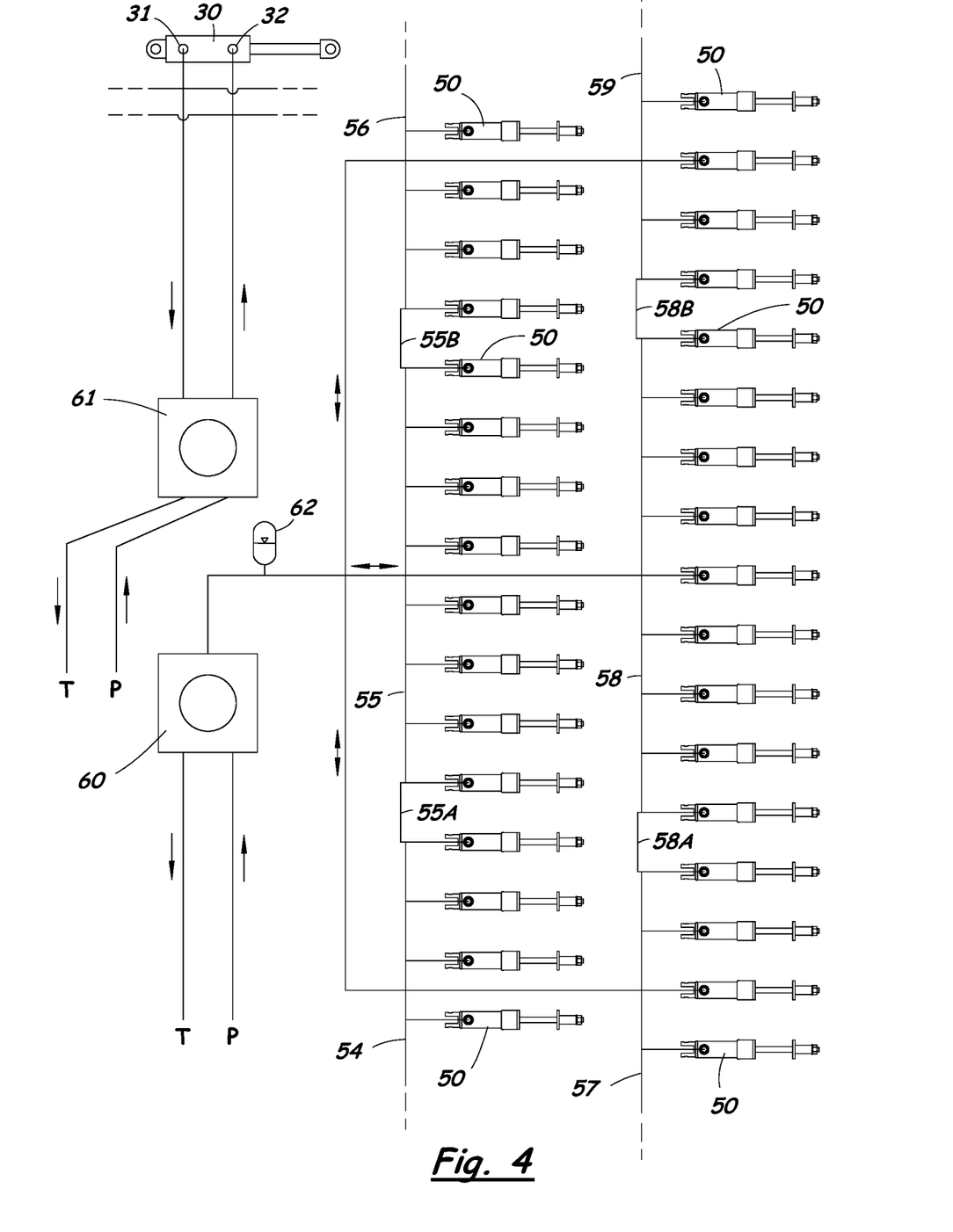
FIG. 4 is a schematic of the present invention's hydraulic components of the implement showing a plurality of single-action hydraulic cylinders connected in parallel to a plurality of headers, which are in turn connected to a pressure-regulating valve. The existing double-acting hydraulic cylinders for adjusting the rockshafts are connected to another pressure-regulating valve on a separate circuit.

A plurality of single-action hydraulic cylinders 50 for the down-pressure systems 20 of a plurality of openers 21 across an implement are shown in FIG. 4. A first group of the single-action hydraulic cylinders 50 are connected in parallel to a first header 55, and a second group of the single-action hydraulic cylinders 50 are connected in parallel to a second header 58. For a multi-section drill with a folding frame 23, additional groups of single-action cylinders 50 are connected to additional headers 56, 57, 54, 59, as shown in FIG. 4. Each of the headers 54-59 allows pressure equalization among the group of cylinders 50 attached to the header to provide consistent and uniform down-pressure on the opener assemblies 21 across the implement. The arrangement also allows hydraulic fluid to move more quickly and easily between cylinders 50 at the far ends of the trunk/header hose. The preferred embodiment also avoids use of 90-degree fittings coming out of the cylinder barrel's ports 53, so as to restrict flow as little as possible. For multi-section air drills (as shown in FIG. 4), the headers 56, 57, 54, 59 on the wings may be connected directly to the headers 55, 58 in the center section by hydraulic connecting lines 55A, 55B, 58A and 58B, so as to speed the hydraulic fluid flow from one end of the drill to the other, which is of value when passing over a terrace or other major undulation in the field terrain.

The first and second headers 55, 58 as well as any additional headers 56, 57, 54, 59 associated with the down-pressure systems 20 are connected to each other, then to a first pressure-regulating valve 60. The first pressure-regulating valve 60 receives hydraulic fluid under pressure from a hydraulic pump through a supply line P, and returns hydraulic fluid to the pump through a return line T. The first pressure-regulating valve 60 supplies a constant hydraulic fluid pressure through the hydraulic circuit to the headers 54-59 and the single-action cylinders 50.

The first pressure-regulating valve 60 is adjustable to allow an operator to adjust a down-pressure force on the opener assemblies 21. The first pressure-regulating valve 60 maintains a substantially constant pressure to the single-action hydraulic cylinders 50 during a normal range of movement of the single-action hydraulic cylinders 50 between extended and retracted positions, thereby maintaining a constant downforce on the opener assemblies 21 and resulting in more uniform operating depth with reduced compaction as compared to OEM prior art springs 15.

A second pressure-regulating valve 61 is connected to the double-acting hydraulic cylinders 30 for causing the rockshaft 24 to move between its first and second positions. The second pressure-regulating valve 61 is an existing component in the conventional down-pressure system. Springs 15 transfer downforce to the openers 21, and the second pressure-regulating valve 61 supplies adjustable hydraulic fluid pressure to the double-acting hydraulic cylinders 30 to maintain a constant torque on the rockshaft 24 without causing too much downforce that would impart excessive lift to the implement frame 23 (e.g., transport wheels no longer touching the soil, which also results in rolling the entire opener 21 beyond its optimal operating position—the opener blade's 37 compound angle changes how it engages the soil, and the opener 21 rides more on the gauge wheel 16 because it is rearward of the blade 37). The optimum maximum down-pressure applied to the double-acting hydraulic cylinders 30 is determined by the weight of the implement (including how much, if any, ballast has been added to frame 23), and the desired weight to be carried by the transport wheels during seeding operations (soil conditions and desired seeding depth being deciding factors in how much downforce should be applied to openers 21, up to a maximum of frame 23 weight available). One preferred embodiment of the present invention is for the double-acting cylinders 30 for the rockshafts 24 to be ran on a completely separate circuit (e.g., different remote hookups on the tractor) from that which supplies pressurized hydraulic fluid to the single-action cylinders 50 on openers 21. Alternatively, both circuits may be plumbed in series or in parallel from a single remote hookup or other hydraulic fluid supply.

When operated in terraces, the preferred embodiment includes one or two accumulators 62 with 2-3 gallon capacity each, which are plumbed into the circuit between first pressure-regulating valve 60 and hoses feeding into the header hoses 54-59. The accumulator 62 reduces the flow required from the pump in certain situations (e.g., when most cylinders 50 have collapsed due to traversing a terrace perpendicular to the direction of travel). Without the accumulator(s) 62, hydraulic fluid may not be recharged quickly enough after 1-2 gallons have been lost via collapsing a large number of cylinders 50 at once; at a normal operating speed of 7 mph, which equates to about 12 ft per second, nearly instantaneous replenishment of hydraulic fluid is needed if the system as a whole is to continue performing at optimum—this is also the reason for Applicant preferring to have all the headers 54-59 equalize amongst themselves before any hydraulic fluid is discharged to the tractor tank T. Tractor remotes on most modern tractors are often limited to 25-30 GPM, which is less than 1 gallon in 2 seconds—e.g., ~24 feet having been seeded in that time. Lack of nearly instantaneous replenishment of hydraulic fluid causes a pressure drop as the opener cylinders 50 re-extend after passing over the crown of the terrace; the pressure drop results in less-than-desired downforce applied to the openers 21, resulting in shallow furrows F and seeds S placed in compromised locations for germination and vigorous development.

The down-pressure system 20 of the present invention has been described above as being used in an agricultural seeding drill ("grain drill," including both box drills and air drills). However, the down-pressure system 20 may also be used with other implements having opener assemblies, such as fertilizer applicators and the like.

Figure 5:
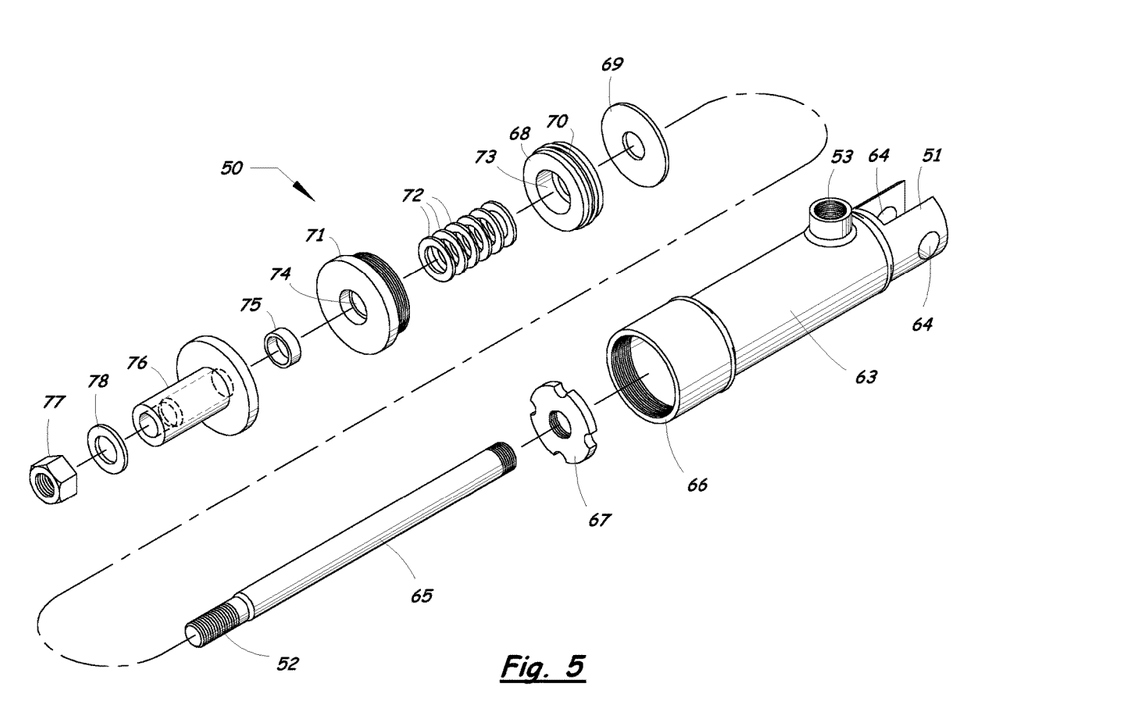
FIG. 5 is an exploded perspective view of one of the single-action hydraulic cylinders used in the down-pressure system of the present invention.

As explained above, the preferred embodiment of the present invention uses single-action cylinders 50 as down-pressure systems 20 on the individual opener assemblies 21. A suitable single-action cylinder 50 for this purpose is illustrated in FIG. 5. The single-action cylinder 50 is a simple displacement cylinder that does not include a piston. The cylinder 50 includes a cylindrical housing 63 ("barrel") having an inner cavity for receiving hydraulic fluid through the port 53. Pin openings 64 are formed at the first end 51 of the cylindrical housing 63 for connecting to the mounting bracket 14. A plunger rod 65 protrudes from the second end 66 of the cylindrical housing 63 for connecting to the opener assembly 21.

A baffle/nut 67 is threaded onto one end of the plunger rod 65 for movement with the plunger rod 65 through the inner cavity of the cylindrical housing 63. A plastic washer 69 fits over the plunger rod 65 and cushions the steel and cast iron parts from slamming against each other. A seal assembly 68 with outer rubber o-ring seals 70 fits into the open end 66 of the cylindrical housing 63 and is held in place by a threaded end cap 71. A plurality of "packing rings" (rubber seals) 72 are provided to fit inside the seal assembly 68 to maintain a tight fit of the seal assembly 68 as rod 65 slides inside during operation.

The plunger rod 65 extends through the packing rings 72 and an inner bore 73 of the seal assembly 68 and an inner bore 74 of the end cap 71. A bushing 75 is provided within the inner bore 74 of the end cap 71 to provide a close tolerance bearing fit around the plunger rod 65 for smooth operation. An attachment assembly 76 ("sleeve") is secured to the free end 52 of the plunger rod 65 by a wedging action and heat-shrink. Assembly 76 fits loosely into a hole (not shown) in opener arm 13 and is secured by a flat washer 78 and threaded locknut 77. Alternatively, the rod 65 is attached via a yoke (not shown) and transverse horizontal pin (not shown) to the hole in opener arm 13 via a threaded fastener attached to the yoke.

An alternative mounting structure for attaching the plunger rod 65 to the hole in the opener arm is described Applicant's copending U.S. patent application Ser. No. 15/190,044 filed on Jun. 22, 2016, the content of which is incorporated herein by reference. In this alternative mounting structure, a bushing with side protrusions and a curved engagement surface for engaging a flat surface on the opener assembly are attached to the plunger rod 65 to minimize bending stresses on the plunger rod 65.

The single-action feature allows the cylinder 50 to float more freely as compared to a double-action cylinder since there is no vacuum on the backside to contend with or extra hydraulic fluid to push or pull. A more freely floating hydraulic system also generates less heat and creates less stress on the components of the opener assembly 21, as well as allowing faster equalization of hydraulic pressure across the width of the implement. The result is that the openers 21 have a more uniform downforce as compared to the OEM spring 15, which in turn results in less soil compaction being caused by the gauge wheel 16 of the opener assembly 21.

Double-acting cylinders can be used in place of the single-action cylinders. However, double-acting cylinders require more length in the barrel to achieve the same amount of stroke. This is of concern in the present invention since there is only a limited distance within which the hydraulic cylinder 50 must retrofit, and there is already a problem with the OEM setup in not having enough down-stroke when the opener blades 37 are engaged in the soil. Similarly, the OEM setup barely has adequate clearance when in transport position (it is not uncommon for openers 21 to drag if roads are crowned too much, or a transport wheel drops off the edge of the road, etc.). And if the OEM setup hits a large object, the OEM spring 15 can compress a few inches further to let it pass, but this is very limited. Therefore, using all of the available space for greater length of hydraulic cylinder stroke is an advantage.

The single-action cylinder 50 in the present invention is pressurized (the plunger rod 65 is fully extended) during transport; this prevents damage to opener 21 components from jumping or flopping if pressure is removed (this configuration also prevents damage to the CCS tank and other air drill components when the frame's 23 wings are folded during transport). By making the plunger rod 65, cylindrical housing 63, and affixing portions to certain dimensions, the openers 21 in the present invention hang at a similar height for transport as the OEM coil spring 15 setup, and yet have more upward travel available if a large object is encountered during transport. This is especially important with wide drills that fold their frames 23 vertically, since it is very difficult for the opener 21 to lift the entire weight of frame 23 if an obstacle is struck while folded.

Preferably, under the present invention the rockshaft hydraulic pressure in cylinders 30 is set at maximum, since it is no longer possible for pressure on this circuit to lift frame 23 by itself (only if the rockshaft circuit was set very high, and the opener circuit was also adjusted too high for the weight and/or ballasting of frame 23 would frame 23 lift). Running rockshaft circuit at maximum allows the rockshaft cylinders to easily overcome the pressure on the opener cylinders 50 when lowering the openers 21 after completing the turn on the field's headlands and beginning a new pass; getting the rockshaft 24 fully rotated quickly allows for greater range of travel of openers 21 if undulations in terrain are encountered soon after beginning the new pass. Rockshaft 24 is fully rotated if at least level or 'square' to the soil terrain, and preferably sloped downward at the rear by 15 to 20 degrees. Failure or slowness of the rockshaft 24 to rotate fully into position causes the openers 21 to run too near their maximum mechanical limit of downstroke, thus increasing the likelihood that opener blades 37 will not maintain proper depth if small depressions in the terrain occur.

The hydraulic circuit for opener cylinders 50 is adjusted in a similar manner as the rockshaft circuit was under the prior art. That is, enough downforce to maintain the desired depth of furrow F, but not so much as to cause excessive compaction of the furrow sidewalls (or cause the frame 23 to lift). The present invention allows far greater success in accomplishing these criteria by maintaining completely uniform pressure across all openers 21 throughout the entire range of stroke.

The hydraulic circuits for the opener cylinders 50 and the rockshaft cylinders 30 may be plumbed in series or in parallel; this provides an advantage of not requiring an extra remote hookup to be available on the tractor. The circuits may also be plumbed entirely separately, in which case the tractor remote for the circuit operating the opener cylinders 50 is always activated in the extended position (cylinders 50 always pressurized).

Alternatively, the rockshaft 24 could be set to hit a single point and shutoff this hydraulic circuit when lowered, although this assumes that there is no hydraulic fluid leakage or bleedoff that would cause issues. It also prevents the rockshaft 24 from releasing pressure if many opener down-pressure cylinders 50 are completely collapsed, such as going over a steep embankment, terrace, or contour bump. John Deere's "Power Beyond" configuration for the circuit operating the rockshaft cylinders 30 provides an improved setup in that the rockshaft cylinders 30 get full oil flow for 15-20 seconds when raising or lowering, but otherwise get oil only on demand. The present invention is fully compatible with Power Beyond (and similar load-sensing hydraulic setups from other tractor OEMs) when the circuit for opener cylinders 50 is completely separated and using a different tractor remote.

The down-pressure system 20 of the present invention gains approximately seven (7) inches of effective downstroke (as determined at the depth-gauging wheel 16), by having full and uniform down-pressure to the very end of that downstroke. In contrast, the OEM setup has zero spring 15 pressure once the initial compression of 1 to 2.5" is lost, and if the spring 15 decompresses 50% from optimum (what is required to consistently cut a furrow F to a given depth), it has only half-enough pressure being exerted on opener 21.

While the invention has been specifically described in connection with specific embodiments thereof, it is to be understood that this is by way of illustration and not of limitation, and the scope of the appended claims should be construed as broadly as the prior art will permit.

What is claimed is:

1. An agricultural implement, comprising:
a frame adapted for forward movement over a field;
a rockshaft assembly connected to the frame, said rockshaft assembly being arranged to pivot about a transverse horizontal axis;
an opener assembly comprising an opener arm, a furrow opener, and a gauge wheel supported for rotation adjacent to the furrow opener to limit the furrow opener to a preset depth of operation, said opener arm having a first end pivotally connected to said rockshaft assembly at a first connection point, and a second end supporting said furrow opener and said gauge wheel;
said rockshaft assembly is rotatable between a first position in which said opener assembly is raised for transport and a second position in which said opener assembly is lowered for engaging soil, and a hydraulic rockshaft cylinder is connected between said frame and said rockshaft assembly for rotating said rockshaft assembly between said first and second positions; and
a down-pressure system for adjustably biasing the opener assembly, said down-pressure system comprising a linear actuator, said linear actuator having a first actuator end connected to said rockshaft assembly at a second connection point, and a second actuator end connected to said opener assembly;
wherein said linear actuator is a hydraulic actuator that has a port connected to a source of hydraulic pressure that biases the linear actuator in an extended direction to apply downforce to the opener assembly, and a first pressure-regulating valve is connected to said source of hydraulic pressure to regulate pressure in said linear actuator during a range of movement of said linear actuator between extended and retracted positions; and
wherein said hydraulic rockshaft cylinder is supplied with sufficient pressure in said second position to overcome the regulated pressure in said hydraulic actuator of the down-pressure system to force said hydraulic actuator into a position between said extended and retracted positions during operation while maintaining a set depth of operation of said furrow opener with said gauge wheel and a set downforce on said opener assembly with the regulated pressure in said hydraulic actuator of said down-pressure system.

2. The agricultural implement according to claim 1, wherein said hydraulic actuator is a single-action hydraulic cylinder.

3. The agricultural implement according to claim 2, wherein said single-action hydraulic cylinder has said port connected to said source of hydraulic pressure that biases the single-action hydraulic cylinder in an extended direction to apply down-pressure force to the opener assembly.

4. The agricultural implement according to claim 1, wherein said opener assembly comprises a plurality of opener assemblies with respective opener arms having first ends pivotally connected to said rockshaft assembly and furrow openers and gauge wheels connected to second ends of said opener arms, and said down-pressure system comprises a plurality of linear actuators connected between said rockshaft assembly and said opener assemblies.

5. The agricultural implement according to claim 4, wherein said linear actuators are single-action hydraulic cylinders.

6. The agricultural implement according to claim 5, wherein said hydraulic cylinders each have a port connected to said source of hydraulic pressure that biases the single-action hydraulic cylinders in an extended direction to apply downforce to the opener assemblies.

7. The agricultural implement according to claim 6, wherein said single-action hydraulic cylinders are connected in parallel.

8. The agricultural implement according to claim 7, wherein said first pressure-regulating valve is connected to said source of hydraulic pressure to maintain a substantially constant pressure to said single-action hydraulic cylinders during a range of movement of said single-action hydraulic cylinders between extended and retracted positions.

9. The agricultural implement according to claim 8, wherein said first pressure-regulating valve is adjustable to allow an operator to adjust a down-pressure force on the opener assemblies.

10. The agricultural implement according to claim 8, wherein said hydraulic rockshaft cylinder comprises a double-acting hydraulic cylinder connected between said frame and said rockshaft assembly for rotating said rockshaft assembly between said first and second positions.

11. The agricultural implement according to claim 10, wherein said double-acting hydraulic cylinder is connected to a second pressure-regulating valve to cause said rockshaft assembly to rotate to said second position when hydraulic pressure is supplied to said second pressure-regulating valve.

12. An agricultural implement, comprising:
a frame adapted for forward movement over a field;
a rockshaft assembly connected to the frame, said rockshaft assembly being arranged to pivot about a transverse horizontal axis;
an opener assembly comprising an opener arm, a furrow opener, and a gauge wheel supported for rotation adjacent to the furrow opener to limit the furrow opener to a preset depth of operation, said opener arm having a first end pivotally connected to said rockshaft assembly at a first connection point, and a second end supporting said furrow opener and said gauge wheel;
said rockshaft assembly is rotatable between a first position in which said opener assembly is raised for transport and a second position in which said opener assembly is lowered for engaging soil, and a hydraulic rockshaft cylinder is connected between said frame and said rockshaft assembly for rotating said rockshaft assembly between said first and second positions; and
a down-pressure system for adjustably biasing the opener assembly, said down-pressure system comprising a linear actuator, said linear actuator having a first actuator end connected to said rockshaft assembly at a second connection point, and a second actuator end connected to said opener assembly;
wherein said linear actuator is a hydraulic actuator that has a port connected to a source of hydraulic pressure that biases the linear actuator in an extended direction to apply downforce to the opener assembly, and a first pressure-regulating valve is connected to said source of hydraulic pressure to regulate pressure in said linear actuator during a range of movement of said linear actuator between extended and retracted positions; and
wherein said hydraulic rockshaft cylinder is supplied with sufficient pressure in said second position to overcome the regulated pressure in said hydraulic actuator of the down-pressure system to force said hydraulic actuator into a position between said extended and retracted positions during operation while maintaining a set depth of operation of said furrow opener with said gauge wheel and a set downforce on said opener assembly with the regulated pressure in said hydraulic actuator of said down-pressure system;
wherein said opener assembly comprises a plurality of opener assemblies with respective opener arms having first ends pivotally connected to said rockshaft assembly and furrow openers and gauge wheels connected to second ends of said opener arms, and said down-pressure system comprises a plurality of linear actuators connected between said rockshaft assembly and said opener assemblies;
wherein said linear actuators are single-action hydraulic cylinders;
wherein said hydraulic cylinders each have a port connected to said source of hydraulic pressure that biases the single-action hydraulic cylinders in an extended direction to apply downforce to the opener assemblies; and
wherein a first group of said single-action hydraulic cylinders are connected in parallel to a first header that allows pressure equalization among said first group of single-action hydraulic cylinders, and a second group of said single-action hydraulic cylinders are connected to a second header that allows pressure equalization among said second group of single-action hydraulic cylinders, and said first and second headers are connected to said first pressure-regulating valve.

13. The down-pressure system according to claim 12, wherein said implement is a multi-section implement, said first header is on a first section of the implement, said second header is on a second section of the implement, and said first and second headers are connected together with each other by a hydraulic connecting line to allow hydraulic fluid flow between said first and second sections of the implement when passing over a terrace or other major undulation in field terrain.

14. In an agricultural implement having a frame adapted for forward movement over a field, an opener assembly having an opener arm, a furrow opener, and a gauge wheel supported for rotation adjacent to the furrow opener to limit the furrow opener to a preset depth of operation, said opener arm having a first end pivotally connected at a first connection point to a rockshaft assembly for rocking movement about a transverse horizontal axis and a second end supporting said furrow opener and said gauge wheel, and a hydraulic rockshaft cylinder connected between the frame and the rockshaft assembly for rotating the rockshaft assembly between a first position in which said opener assembly is raised for transport and a second position in which said opener assembly is lowered for engaging soil, an adjustable down-pressure system for rotatably biasing the opener arm, the down-pressure system comprising:
a hydraulic actuator having a first actuator end connected to said rockshaft assembly at a second connection point spaced from said first connection point, and a second actuator end connected to said opener assembly;
wherein said hydraulic actuator has a port connected to a source of hydraulic pressure that biases the hydraulic actuator in an extended direction to apply downforce to the opener assembly, and a first pressure-regulating valve is connected to said source of pressure to regulate pressure in said hydraulic actuator during a range of movement of said hydraulic actuator between extended and retracted positions; and
wherein said hydraulic rockshaft cylinder is supplied with sufficient pressure in said second position to overcome the regulated pressure in said hydraulic actuator of the down-pressure system to force said hydraulic actuator into a position between said extended and retracted positions during operation while maintaining a set depth of operation of said furrow opener with said gauge wheel and a set downforce on said opener assembly with the regulated pressure in said hydraulic actuator of said down-pressure system.

15. The down-pressure system according to claim 14, wherein said hydraulic actuator is a single-action hydraulic cylinder.

16. The down-pressure system according to claim 15, wherein said first pressure-regulating valve is adjustable to maintain a substantially constant pressure to said hydraulic cylinder during a range of movement of said hydraulic cylinder between extended and retracted positions.

17. The down-pressure system according to claim 16, wherein said hydraulic rockshaft cylinder comprises a double-acting hydraulic cylinder connected between said frame and said rockshaft assembly for rotating said rockshaft assembly between a first position in which said opener assembly is raised for transport and a second position in which said opener assembly is lowered for engaging soil.

18. The down-pressure system according to claim 17, wherein said double-acting hydraulic cylinder is connected to a second pressure-regulating valve to cause said rockshaft assembly to rotate to said second position when hydraulic pressure is supplied to said second pressure-regulating valve.

19. The down-pressure system according to claim 18, wherein said second pressure-regulating valve maintains a preset constant pressure on said double-acting hydraulic cylinder when said rockshaft assembly is rotated to said second position.

20. The down-pressure system according to claim 15, wherein the opener assembly comprises a plurality of opener assemblies with respective opener arms having first ends pivotally connected to the rockshaft assembly and furrow openers and gauge wheels connected to the opener arms, and said hydraulic actuator comprises a plurality of single-action hydraulic cylinders connected between said rockshaft assembly and said opener assemblies, and said single-action hydraulic cylinders are connected to said source of hydraulic pressure.

21. In an agricultural implement having a frame adapted for forward movement over a field, an opener assembly having an opener arm, a furrow opener, and a gauge wheel supported for rotation adjacent to the furrow opener to limit the furrow opener to a preset depth of operation, said opener arm having a first end pivotally connected at a first connection point to a rockshaft assembly for rocking movement about a transverse horizontal axis and a second end supporting said furrow opener and said gauge wheel, and a hydraulic rockshaft cylinder connected between the frame and the rockshaft assembly for rotating the rockshaft assembly between a first position in which said opener assembly is raised for transport and a second position in which said opener assembly is lowered for engaging soil, an adjustable down-pressure system for rotatably biasing the opener arm, the down-pressure system comprising:

a hydraulic actuator having a first actuator end connected to said rockshaft assembly at a second connection point spaced from said first connection point, and a second actuator end connected to said opener assembly;

wherein said hydraulic actuator has a port connected to a source of hydraulic pressure that biases the hydraulic actuator in an extended direction to apply downforce to the opener assembly, and a first pressure-regulating valve is connected to said source of pressure to regulate pressure in said hydraulic actuator during a range of movement of said hydraulic actuator between extended and retracted positions; and wherein said hydraulic rockshaft cylinder is supplied with sufficient pressure in said second position to overcome the regulated pressure in said hydraulic actuator of the down-pressure system to force said hydraulic actuator into a position between said extended and retracted positions during operation while maintaining a set depth of operation of said furrow opener with said gauge wheel and a set downforce on said opener assembly with the regulated pressure in said hydraulic actuator of said down-pressure system;

wherein said hydraulic actuator is a single-action hydraulic cylinder;

wherein the opener assembly comprises a plurality of opener assemblies with respective opener arms having first ends pivotally connected to the rockshaft assembly and furrow openers and gauge wheels connected to the opener arms, and said hydraulic actuator comprises a plurality of single-action hydraulic cylinders connected between said rockshaft assembly and said opener assemblies, and said single-action hydraulic cylinders are connected to said source of hydraulic pressure; and wherein a first group of said single-action hydraulic cylinders are connected in parallel to a first header that allows pressure equalization among said first group of single-action hydraulic cylinders, and a second group of said single-action hydraulic cylinders are connected in parallel to a second header that allows pressure equalization among said second group of single-action hydraulic cylinders, and said first and second headers are connected to said first pressure-regulating valve.

22. The down-pressure system according to claim 21, wherein said implement is a multi-section implement, said first header is on a first section of the implement, said second header is on a second section of the implement, and said first and second headers are connected together with each other by a hydraulic connecting line to allow hydraulic fluid flow between said first and second sections of the implement when passing over a terrace or other major undulation in field terrain.

23. In an agricultural grain drill having a frame adapted for forward movement over a field, an opener assembly having an opener arm, a furrow opener, and a gauge wheel supported for rotation adjacent to the furrow opener to limit the furrow opener to a preset depth of operation, a rockshaft assembly connected to the frame for pivoting about a transverse horizontal axis, said opener arm having a first end pivotally connected to the rockshaft assembly and a second end supporting the furrow opener, and a hydraulic rockshaft cylinder connected between the frame and the rockshaft assembly for rotating the rockshaft assembly between a first position in which said opener assembly is raised for transport and a second position in which said opener assembly is lowered for engaging soil, a down-pressure system for adjustably biasing the opener arm, the down-pressure system comprising:

a hydraulic actuator having a first actuator end connected to said rockshaft assembly, and a second actuator end connected to said opener assembly, said hydraulic actuator comprising a single-action hydraulic cylinder connected to a source of hydraulic pressure to bias the hydraulic cylinder in an extended direction to apply downforce to the opener assembly when the rockshaft is rotated to said second position; and a first pressure-regulating valve connected to said source of hydraulic pressure to regulate pressure in said hydraulic actuator during a range of movement of said hydraulic actuator between extended and retracted positions;

wherein said hydraulic rockshaft cylinder is supplied with sufficient pressure in said second position to overcome the regulated pressure in said hydraulic actuator of the down-pressure system to force said hydraulic actuator into a position between said extended and retracted positions during operation while maintaining a set depth of operation of said furrow opener with said gauge wheel and a set downforce on said opener assembly with the regulated pressure in said hydraulic actuator of said down-pressure system.

\* \* \* \* \*